United States Patent [19]
Chery

[11] 3,935,905
[45] Feb. 3, 1976

[54] EARTH WORKING GARDENING TOOL

[75] Inventor: Francois Chery, Colombes, France

[73] Assignee: Aciers et Outillage Peugeot, Audincourt, France

[22] Filed: Oct. 4, 1974

[21] Appl. No.: 512,145

[30] Foreign Application Priority Data
Oct. 5, 1973 France .............................. 73.35626

[52] U.S. Cl. ..................... 172/40; 172/41; 172/102
[51] Int. Cl.² ..................... A01B 35/00; A01B 35/32
[58] Field of Search .......... 172/40, 102, 41, 44, 125

[56] References Cited
UNITED STATES PATENTS

| | | | |
|---|---|---|---|
| 2,859,676 | 11/1958 | Pottol et al. ........................ | 172/40 |
| 3,461,969 | 8/1969 | Bodine ............................. | 172/40 X |
| 3,710,870 | 1/1973 | Pfeiffer ............................. | 172/40 |

Primary Examiner—George J. Marlo
Attorney, Agent, or Firm—Eric P. Schellin

[57] ABSTRACT

Gardening tool. A blade adapted to work the ground constitutes one side of a frame which is pivotably mounted on the housing of the tool about a shaft forming the opposite side of the frame. Drive elements within the housing are connected to a third side of the frame through transmission elements within the housing so as to impart to the blade a continuous pivotal vibratory movement. A detachable handle connected to the housing enables the latter to be handled. A cooling fan in the housing discharges air through orifices in the upper end of the handle.

11 Claims, 5 Drawing Figures

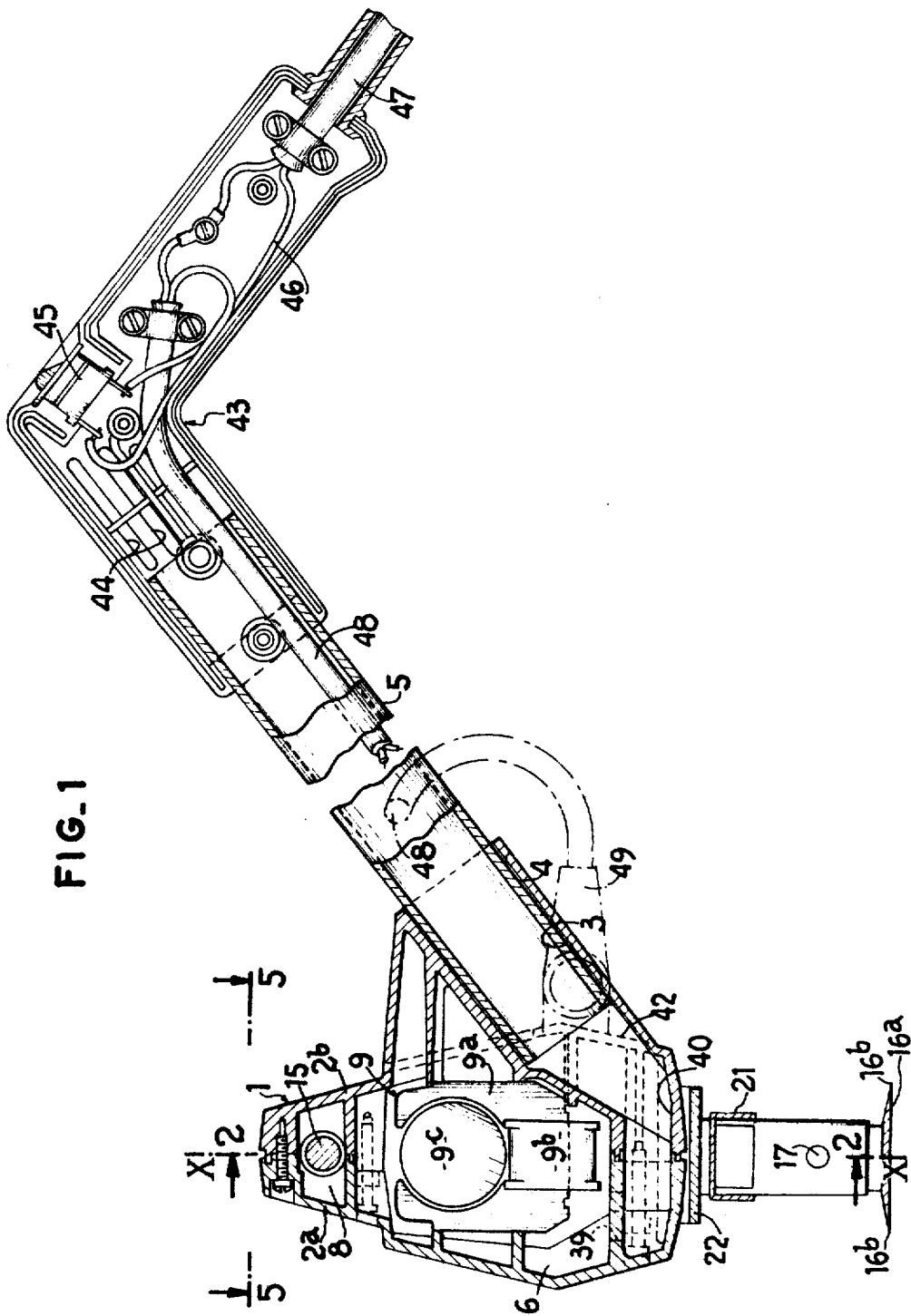

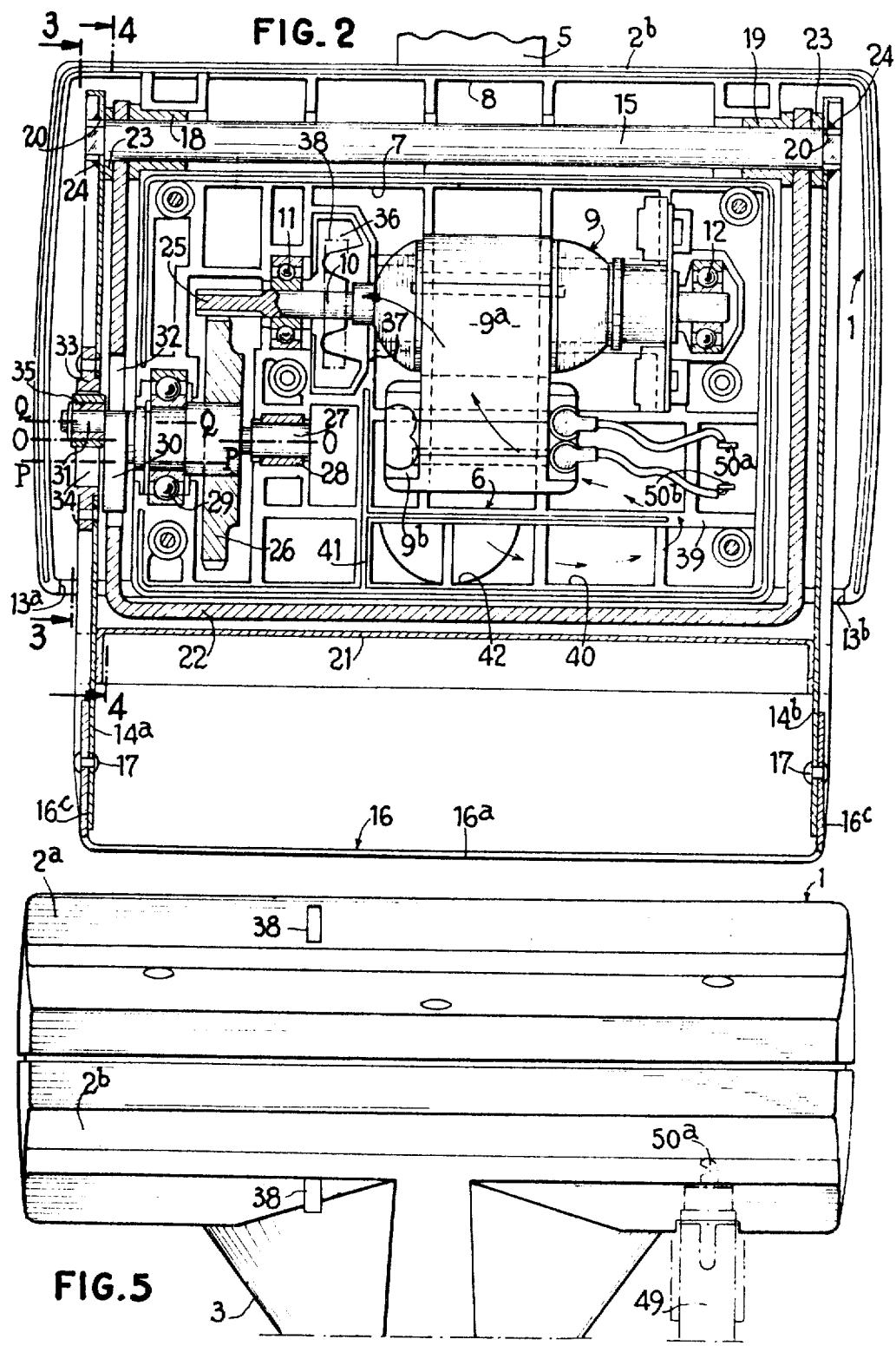

EARTH WORKING GARDENING TOOL

The present invention relates to gardening tools and more particularly to such a tool for carrying out effortless gardening operations, such as aering the ground on the surface and the destruction of weeds.

According to the invention there is provided a gardening tool comprising a housing, a blade for working the ground, drive means disposed within the housing and connected to the blade through transmission means which are also disposed within the housing and adapted to impart to the blade a continuous vibratory movement, and handling means connected to the housing for handling the tool.

Further features and advantages of the invention will be apparent from the ensuing description with reference to the accompanying drawings given by way of example.

In the drawings:

FIG. 1 is a sectional view of a gardening tool according to one embodiment of the invention;

FIG. 2 is a sectional view taken on line 2—2 of FIG. 1;

Figure 4:
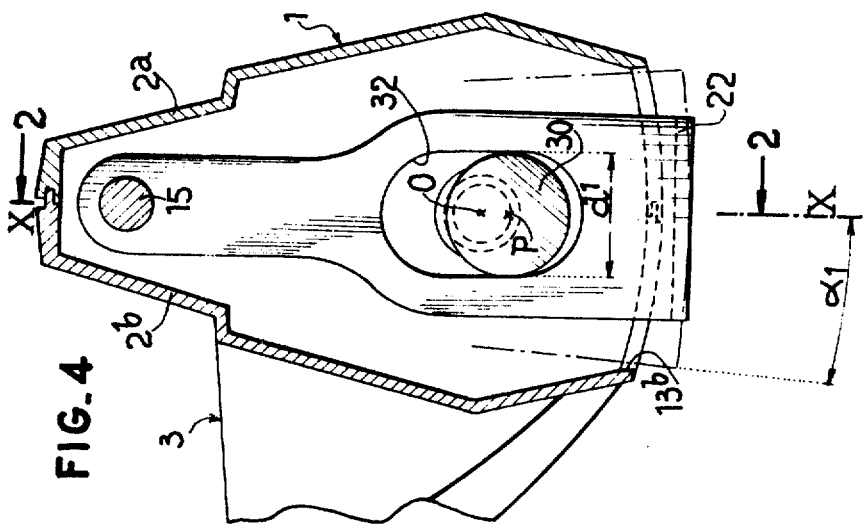
Figure 3:
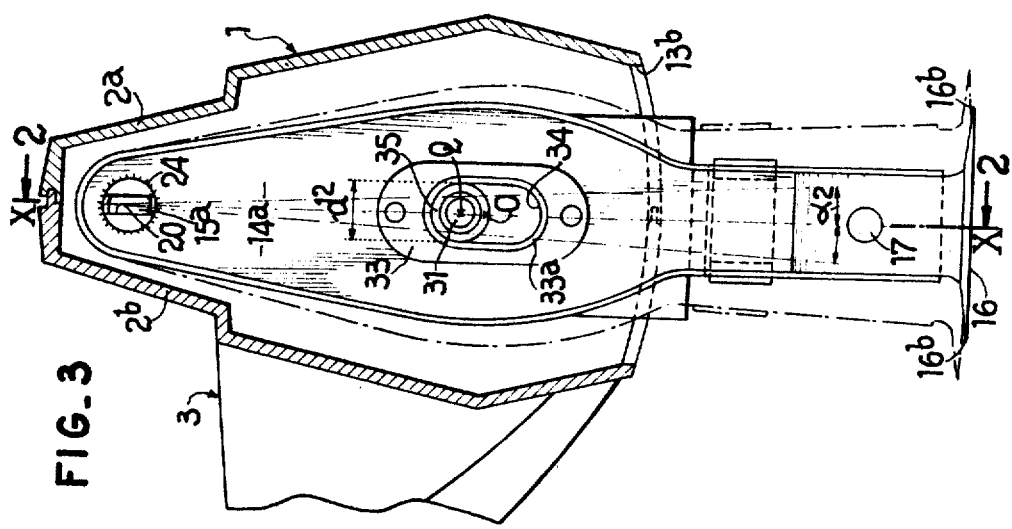

FIGS. 3 and 4 are partial sectional views taken on lines 3—3 and 4—4 respectively of FIG. 2, and FIG. 5 is a partial plan view of the gardening tool on line 5—5 of FIG. 1.

FIGS. 1 to 5 show an embodiment of a gardening tool according to the invention which comprises a housing 1 preferably of plastics material and in two parts 2a and 2b which have a joint plane X—X which is vertical when the tool is in position for working the ground. The housing 1 has at the rear thereof means defining a cavity 3 for receiving a lower end portion 4 of a handle 5 which is also preferably of plastics material and permits the control and guiding of the gardening tool.

Note that this handle is detachable to facilitate the stowing away of the gardening tool.

As shown in particular in FIGS. 1 and 2, three main compartments 6, 7 and 8 are defined in the housing 1, the compartment 6 being contained in the compartment 7 and the compartment 7 being contained in the compartment 8 which is therefore the largest compartment.

The compartment 6 is arranged to receive an electric motor 9 which comprises a magnetic circuit 9a, an energizing coil 9b and a rotor 9c keyed on an output shaft 10. The latter is mounted in two bearings 11 and 12 suitably disposed in the housing 1.

Formed in the lower part of the housing between lateral adjacent walls of the compartments 7 and 8, are two slots 13a and 13b which allow the passage of two vertically extending support sheets 14a and 14b which are secured to a pivot shaft 15 extending through the housing 1 throughout the width of the latter in a direction parallel to the shaft 10 of the electric motor 9. The support sheets 14a and 14b are adapted to support a work blade 16 having a horizontal portion 16a, on which are formed two cutting edges 16b, and two upwardly bent vertical portions 16c which are riveted to the corresponding support sheets 14a and 14b by rivets 17.

Note that a plurality of types of interchangeable blades may be employed, these blades having different shapes and being sharpened in different ways. In this case, the rivets 17 are advantageously replaced by detachable fixing means, for example including wing nuts or the like.

The shaft 15 is mounted in two bearings 18 and 19 which are suitably mounted in the compartment 8 of the housing 1. the shaft 15 has at both ends flat portions 15a (FIG. 3) which are introduced in rectangular apertures 20 provided respectively in the upper parts of the support sheets 14a and 14b. The assembly formed by the support sheets and blade 16 thus rotates with the shaft 15. A strut 21 extends in a direction parallel to the blade 16 between the sheets 14a and 14b to reinforce the frame formed by the shaft 15, the support sheets 14a and 14b and the blade 16.

A U-shaped counterweight 22 is suspended by the ends of its branches from the shaft 15 so as to be freely pivotable about the latter. These ends are disposed laterally between the bearings 18 and 19 respectively and two spacer washers 23 against which washers the support sheets 14a and 14b are respectively applied, the assembly being held in position axially by welding at 24.

The shaft 10 of the motor has a toothed end portion 25 which meshes with an intermediate drive gear pinion 26 keyed on a shaft 27. The latter, mounted in bearings 28 and 29 received in the compartment 7 of the housing 1, comprises an eccentric 30 which is in one piece with the shaft (FIG. 4) and an eccentric bearing portion 31 also in one piece with the shaft (FIG. 3). The eccentric 30 and the bearing portion 31 extend beyond the corresponding lateral wall of the compartment 7, the axes of the shaft 27, of the eccentric 30 and of the eccentric bearing portion 31 are designated in the drawings by the references O—O, P—P and Q—Q respectively.

It can be seen from FIG. 4 that the eccentric 30 is received in an aperture 32 formed in the corresponding branch of the counterweight 32, this aperture having a width $d_1$. The eccentricity OP determines the angle of movement $\alpha_1$ of the balancing counterweight 22 on each side of the vertical plane X—X of the gardening tool.

A reinforcing plate 33 of oblong shape is riveted to the support sheet 14a and has a thickened centre portion 33a in which is formed an oblong aperture 34. The latter is adapted to receive a roller 35 which is freely rotatable on the eccentric bearing portion 31 of the shaft 27 whose eccentricity OQ determines the angle of movement $\alpha_2$ of the support sheets 14a and 14b and consequently the travel of the blade 16 on each side of the vertical plane X—X. The width of the oblong aperture 34 is $d_2$.

In order to cool the electric driving motor 9, a fan 36 is keyed on the shaft 10 of the motor. This fan is placed in front of an opening 37 formed in the lateral wall of the compartment 6 so as to draw the air out of the latter. This air is blown outwardly through discharge orifices 38 provided in the outer wall of the compartment 7 (FIGS. 2 and 5). The compartment 6 also has an air inlet opening 39 which puts this compartment in communication with a space 40 separated from the compartment 7 by a partition wall 41. This space 40 communicates with the cavity 3 through a mouth portion 42 formed in the part 2b of the housing (FIG. 1).

The handle 5 is constituted by a cylindrical tube which extends upwardly and obliquely, in the working position of the tool, and receives at its upper end a grip 43 which is shaped to facilitate the gripping of this grip. This grip 43 is fitted in a sealed manner on the tube 5 and has air intake orifices 44. Consequently the compartment 6 of the housing is connected to the air intake orifices 44 so that the air for ventilating the motor is not taken from near to the ground but in the vicinity of the hand of the user, which is about 80 to 120 cm above the ground.

In this way any dust raised by the blade 16 is precluded from entry in the housing.

The grip 43 also includes a control switch 45 which is inserted in one of the supply lines 46 of the electric motor 9, the latter being supplied with power through a mains cable 47 and an electric double-wire connecting line 48. The latter extends through the grip 43 and the tube 5 and issues from the latter through an opening 48 and terminates in a connecting plug 49 which can be plugged into a socket (not shown) provided in the housing 1. Only the two contacts 50a and 50b of this socket are shown in FIG. 2. The tube 5 is a force fit in the cavity 3 and may be separated from the housing 1 when stowing away the tool. When separating the tube and housing, the plug 49 must be disconnected.

It will be clear from the foregoing description of the gardening tool how the latter operates. When the switch 45 is actuated and the handle 5 and the plug 49 are in correct position the electric motor rotates the shaft 27.

Consequently, the eccentric 30 and the eccentric bearing portion 31 are moved along the oblong apertures 32 and 34 respectively and cause the pivoting about the axis of the shaft 15 of, on one hand, the counterweight 22 and, on the other, the support sheets 14a and 14b and blade 16. These pivoting movements are of course in opposite directions owing to the diametrally opposed disposition of the eccentric 30 and eccentric bearing portion 31. In this way a very satisfactory balancing of the tool is achieved.

Note that, depending on the inclination given to the handle 5, the blade 16 operates on the surface or penetrates the ground. Thus it can break the surface crust of the earth and also cut the roots of harmful plants. As the blade 16 undergoes its pivotal movements in bearing against the ground, the user draws along the tool in a direction perpendicular to the blade by means of the handle 5.

Note that the electric motor 9 described hereinbefore may be replaced by any other type of motor, such as a heat engine, provided of course that the necessary adaptations are made.

Having now described my invention what I claim as new and desire to secure by Letters Patent is:

1. A gardening tool comprising a housing, a substantially rectangular frame, a substantially flat blade defining two major parallel surfaces and said blade being mounted on the frame and constituting a first side of the frame for working the ground while said flat surfaces of said blade are substantially parallel with the ground surface, a shaft defining an axis and forming a second side of said frame opposite to the said first side thereof, bearing means provided in said housing for rotatably receiving said shaft thereby allowing pivotable movement of said frame about said axis, drive means disposed within the housing, transmission means also disposed within the housing and drivingly connecting the drive means to the frame to impart to the frame a continuous pivotal vibratory movement, and handling means connected to the housing for handling the tool.

2. A tool as claimed in claim 1, wherein the frame has a third side which is connected to the transmission means.

3. A tool as claimed in claim 2, wherein the transmission means comprise a transmission having an eccentric, and means defining an oblong aperture in said third side of the frame, the eccentric being engaged in the oblong aperture.

4. A tool claimed in claim 3, wherein the drive means are enframed by said frame and comprise an output shaft having a toothed end portion, an intermediate shaft on which intermediate shaft the eccentric is fixed, and a gear pinion keyed on the intermediate shaft and meshed with the toothed end portion of the output shaft.

5. A tool as claimed in claim 4, comprising a counterweight having a U-shape, the branches of which are pivotably mounted on said shaft, one of the branches of the U-shaped counterweight defining an oblong aperture, an eccentric which is part of the transmission means being engaged and movable in the oblong aperture in the counterweight branch, and the eccentric for the counterweight being provided on the intermediate shaft in a position which is diametrally opposed to the eccentric for the frame.

6. A tool as claimed in claim 1, wherein the blade has edges which are parallel to the axis of said shaft and are sharpened so as to form cutting edges.

7. A tool as claimed in claim 1, comprising a counterweight pivotably mounted in the housing and operatively connected to the transmission means so as to be pivoted in an opposite direction to the frame.

8. A tool as claimed in claim 7, wherein the counterweight has a U shape and has a web portion terminating in two branches which branches are mounted adjacent their ends on said shaft, the web portion of the U-shaped counterweight being parallel to the axis of said shaft.

9. A tool as claimed in claim 8, wherein one of the branches of the U-shaped counterweight defines an oblong aperture and an eccentric which is part of the transmission means is engaged and movable in the oblong aperture in the counterweight branch.

10. A tool as claimed in claim 1, wherein the handling means comprise a tubular body connected to said housing and constituting a conduit and cooling air inlet orifices are formed in the tubular body near to an end of the tubular body remote from the housing, and the drive means are disposed in a compartment which is defined in the housing and communicates with the tubular body and with the remaining space of the housing through fan means which are drivingly connected to said drive means and discharge air into said remaining space, said remaining space communicating with the exterior of said housing.

11. A gardening tool comprising a housing, a blade for working the ground mounted to be vibratable relative to the housing, drive means disposed within the housing, transmission means also disposed within the housing and drivingly connecting the drive means to the blade to impart to the blade a continuous vibratory movement, and handling means connected to the housing for handling the tool wherein the handling means comprise a tubular body connected to said housing and constituting a conduit and cooling air inlet orifices are formed in the tubular body near to an end of the tubular body remote from the housing, and the drive means are disposed in a compartment which is defined in the housing and communicates with the tubular body and with the remaining space of the housing through fan means which are drivingly connected to said drive means and discharge air into said remaining space, said remaining space communicating with the exterior of said housing.

* * * * *